United States Patent [19]

Lundin

[11] Patent Number: 4,794,511
[45] Date of Patent: Dec. 27, 1988

[54] APPARATUS AND METHOD FOR GENERATING TWO-PHASE SIGNALS FOR USE WITH A RESOLVER TO DIGITAL CONVERTER

[75] Inventor: Robert S. Lundin, Northfield, Conn.

[73] Assignee: The Superior Electric Company, Bristol, Conn.

[21] Appl. No.: 142,792

[22] Filed: Jan. 11, 1988

[51] Int. Cl.$^4$ .................. H02M 5/06; H01F 33/00; G05B 1/06
[52] U.S. Cl. .................. 363/156; 336/79; 336/135; 310/168; 318/661; 341/116
[58] Field of Search .................. 363/152–156, 363/170, 175, 176; 323/361, 363; 336/79, 135; 310/168; 340/347 SY; 318/254, 629, 661, 600–605

[56] References Cited

U.S. PATENT DOCUMENTS

| | | | |
|---|---|---|---|
| 3,123,785 | 3/1964 | Möller | 336/79 X |
| 3,641,467 | 2/1972 | Ringland et al. | 318/661 X |
| 3,705,343 | 12/1972 | Ringland et al. | 318/661 X |
| 4,255,682 | 3/1981 | Toida et al. | 336/135 X |
| 4,631,510 | 12/1986 | Nagarkatti et al. | 310/168 X |
| 4,700,189 | 10/1987 | Welburn | 318/661 X |
| 4,733,117 | 3/1988 | Perrins | 318/661 X |

Primary Examiner—Patrick R. Salce
Assistant Examiner—Emanuel T. Voeltz
Attorney, Agent, or Firm—McCormick, Paulding & Huber

[57] ABSTRACT

Two-phase voltage signals for use with a resolver-to-digital converter (RDC) are produced as a periodic function of permeance developed across an air gap between a rotor and stator wherein the permeance varies as a periodic sinusoidal function which can be related to the electrical angle of the position of the rotor. The two-phase voltage signals are developed as a function of inductive reactance and follow the form $$V_x = e_c \frac{[A - A_n - B + B_n]}{[A + A_n + B + B_n]}$$

$$V_y = e_c \frac{[A - A_n + B - B_n]}{[A + A_n + B + B_n]}$$

wherein the phase angle between $V_x$ and $V_y$ is exactly 90° and the term $[A+A_n+B+B_n]$ is completely free of second harmonics.

2 Claims, 3 Drawing Sheets

APPARATUS AND METHOD FOR GENERATING TWO-PHASE SIGNALS FOR USE WITH A RESOLVER TO DIGITAL CONVERTER

BACKGROUND OF THE INVENTION

The present invention relates generally to resolver systems and deals more specifically with the generation of two-phase (sine/cosine) signals for use with a resolver-to-digital converter (RDC).

It is well known to use a resolver to provide information representative of the angular position of a shaft, such as a motor shaft, or the linear position of a "slider" in a linear system of motion. Known resolvers include the optical type which use multi-track coded aperture disks in which each finite angular position of a shaft is uniquely represented by a binary coded decimal (BCD) value. Since each position in 360° of rotation is uniquely coded, there can be no ambiguity within a full revolution, however, the number of positions that can be coded are limited to the number of apertures which can be placed on the disk.

Other known resolvers are of the electromagnetic type which generate a sine and cosine signal as a function of shaft position angle and may produce a single cycle sine/cosine signal for each shaft revolution or multi-cycle sine/cosine signals for each shaft revolution. Often, a differential multi-cycle resolver is used to prevent ambiguity in multi-cycle resolvers wherein there are as many angular shaft positions as there are electrical cycles in a shaft revolution. A differential multi-cycle resolver is in fact two resolvers wherein the electrical cycles per revolution of each resolver have a difference of one. The combined information provided by the two resolvers provide a non-ambiguous angular shaft position for each of the shaft positions in one revolution of the shaft. It is generally not desirable to use a differential multi-cycle resolver to determine angular shaft position due to its complexity, expense, etc.

There exist a number of other methods and apparatus to generate two-phase (sine/cosine) signals, one of which includes the classical sine/cosine resolver. In the classical sine/cosine resolver, a stator, generally comprised of a set of magnetically permeable poles, is coupled through a radial air gap to a rotor which has a pair of magnetically permeable poles disposed 180 mechanical degrees from one another. The stator poles are disposed 120 mechanical degrees from one another in the case of a three phase output such as typically produced by a synchro. In the case of a resolver, the stator poles are disposed from one another at an angle equal to 90 mechanical degrees to produce a two phase output.

The operation of a classical sine/cosine resolver is generally well known and typically involves the excitation of the rotor by an AC carrier signal which is in the order of several kilohertz. As the rotor rotates through an angle of 360 mechanical degrees, the carrier signal which excites the rotor induces in the stator poles a signal which is modulated by the appropriate trigonometric function of the angle of the shaft position. Accordingly, the stator signals in a two phase resolver are sine and cosine modulations of the AC carrier signal. In the case of a three phase resolver (synchro), the stator signals are sine modulations of the AC carrier signal wherein the sine functions are electrically displaced by 120 electrical degrees from one another.

The stator signals may be decoded by a resolver-to-digital converter (RDC); however, the RDC expects to receive a sine/cosine signal and the three phase stator output signals must be converted to a two phase signal. Such conversion is generally well known and may be made typically by a Scott-T transformation utilizing electromechanical or electronic devices. The resultant two phase (sine/cosine) signal is then converted to an electrical angle and is generally represented in a digitally encoded format.

The resolution and accordingly, the accuracy of the classical sine/cosine resolver can be improved by increasing the number of sets of stator poles to increase the number of electrical cycles per shaft revolution. Since there is a physical limitation to the number of sets of stator poles that may be located about 360°, the number of electrical cycles may be increased by providing a number of salients or teeth on each stator pole and likewise providing a number of salients or teeth spaced equidistant from one another about the circumference of the rotor for coaction with the teeth on the stator poles. The number of electrical cycles in a 360 mechanical degree rotation of the rotor will accordingly correspond to the number of rotor teeth. Since the rotor is excited by the AC carrier signal, carrier signals are induced in the stator poles and are modulated by the corresponding trignometric function of the shaft position angle.

Another method for determining the angular position of a rotating shaft is to observe the air gap permeance between the rotor and stator salients as a function of the shaft angle to which a rotor is coupled. The air gap permeance varies as the cosine of the electrical angle as the rotor moves from one aligned position of another aligned position. Since inductance is directly proportional to permeance, the permeance may be inferred by observing the value of inductance. One known method of inferring inductance is to measure the voltage drop across a small sensing resistor placed in series with the winding about a stator pole. The dominant impedance in the circuit becomes the inductive reactance if the series sensing resistor and the winding resistance are kept low with respect to the minimum inductive reactance. It will be seen that the current in the circuit varies inversely with the inductance and a voltage sensed across the series sensing resistor will be inversely proportional to the inductance and accordingly, to the permeance. Since the current varies inversely as the inductance, relatively complex measuring devices are required to translate the measured current into corresponding sine and cosine signals and will also generally require some type of a "look-up" table to implement the translation.

A further method and apparatus generally known and used to achieve increased resolution includes the utilization of a single cycle resolver with a step up gear mechanism so that one revolution of an input shaft results in many revolutions of the single cycle resolver employed. There are a number of problems generally associated with such a stepped-up single cycle resolver among which are gearing backlash, tooth-to-tooth errors, gear run-out, and a number of errors associated with fabrication of the gears, associated shafts, bearings and mounting methods.

Another known method and apparatus for obtaining increased resolution and accuracy and which overcomes a number of problems associated with the above-mentioned methods and apparatus is disclosed in a copending application assigned to the same assignee of the present invention and entitled RELUCTANCE SYNCHRO/RESOLVER, Ser. No. 043,081 filed Apr. 27, 1987, wherein the cyclic variation and permeance is related to the inductance of the respective phases. The reluctance synchro/resolver disclosed in the above-referenced patent generally overcomes the problems associated with sensing variations in permeance which is inversely proportional to the current flowing through the winding. In the above-referenced patent application, the signals derived from each of the various phases are appropriately added and subtracted by interconnection of the stator windings to provide a sine and cosine signal as a function of the electrical angle of the rotor. The sine and cosine signals are in turn provided to the input of the RDC for decoding.

The known methods and apparatus generally assume harmonic free sine and cosine signals which have exactly equal peak amplitudes and are exactly 90 electrical degrees apart from one another. In reality, the signals are not harmonic free and often times are not 90 electrical degrees apart from one another. Accordingly, there are errors between the actual shaft angle position and the determined shaft angle position.

The difference between the actual and the measured or sensed shaft angle positions may be attributable to one or more of the following:

RDC input signals are not in quadrature;
Harmonics are present in the input signals;
Amplitude inbalance between the two (sine/cosine) RDC signals, and
Reference signal phase shift and quadrature signal presence from speed effects.

It is the general object of the present invention therefore to provide a method and apparatus which generally overcome the above-identified sources of error generally associated with the provision of two-phase (sine/cosine) resolver signals for use in a resolver-to-digital converter.

SUMMARY OF THE INVENTION

In accordance with the present invention, a method and apparatus is presented for producing two-phase voltage signals for use with a resolver-to-digital converter (RDC) wherein the RDC input voltage $V_x$ and $V_y$ are determined as a periodic function of permeance developed across an air gap between a rotor and stator. Windings associated with the stators are excited by a carrier voltage signal and as the rotor rotates, the air gap permeance varies as a periodic sinusoidal function which can be related to the electrical angle of the position of the rotor. Since permeance may be inferred directly from inductance, inductance may be used to determine rotor position.

In accordance with the invention, the two-phase voltage signals are developed as a function of inductive reactance and follow the form $$V_x = e_c \frac{[A - A_n - B + B_n]}{[A + A_n + B + B_n]}, \text{ and}$$

$$V_y = e_c \frac{[A - A_n + B - B_n]}{[A + A_n + B + B_n]}$$

wherein the phase angle between $V_x$ and $V_y$ is exactly 90° and the term $[A + A_n + B + B_n]$ is completely free of second harmonics.

In one aspect of the invention, the windings associated with the stators are connected in a series aiding and opposing arrangement and is configured as an inductance bridge to produce the $V_x$ and $V_y$ RDC voltage signals as a function of the quotient of the terms $[A - A_n - B + B_n]$ divided by $[A + A_n + B + B_n]$ and $[A - A_n + B - B_n]$ divided by $[A + A_n + B + B_n]$ for $V_x$ and $V_y$, respectively.

In another aspect of the invention, the RDC voltage signals are derived electronically by the appropriate addition and subtraction of voltage signals induced in the respective stator windings as the rotor rotates.

BRIEF DESCRIPTION OF THE DRAWINGS

Other features and advantages of the present invention will become readily apparent from the following description and claims taken in conjunction with the drawings wherein:

DETAILED DESCRIPTION OF THE PREFERRED EMBODIMENTS

Prior to describing the method and apparatus embodying the present invention, it is first necessary for a full understanding of the invention to present a brief description of the prior art for comparison and such a description follows.

In a reluctance synchro/resolver having stator salients, such as described in the above-referenced patent assigned to the same assignee as the present invention, wherein poles are arranged so that the stator salients on one set of poles are at a minimum permeance position when the stator salients of another set of poles are at the maximum permeance position and further having another two sets of poles the stator salients of which are disposed at some angle from the first and second sets of poles. In such an arrangement, the permeances may be expressed as given below in equation 1.

Figure 1:
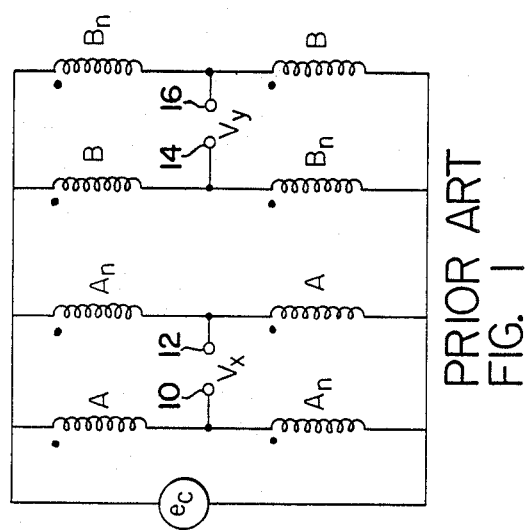
FIG. 1 is a schematic circuit diagram of an inductance bridge representative of the prior art for producing two-phase voltage signals for use with a resolver-to-digital converter (RDC).

Referring to FIG. 1, the poles are designated as "A" "$A_n$", "B", and "$B_n$", where the subscript "n" designates the poles having salients located at minimum permeance positions when the un-subscripted poles have their salients located at maximum permeance positions. In addition, as explained in the above referenced patent, the "B" poles' salients are shifted from the "A" poles' salients by some angle, "a".

In the rotor position for which a given set of salients of the stator are aligned with their cooperating rotor salients, the air gap permeance will be at a maximum. As the rotor is moved through an electrical cycle, the salients pass through a point of maximum misalignment at 180 electrical degrees and at this point, the permeance is at a minimum. It is clear that the permeance can never become negative and that the shape of the permeance versus electrical angle is a mirror image about the 180° point. It will be recognized that the above describes a periodic function having a DC offset and which function can be expressed as:

$$P = P_o[1 + K_1 \cos(x) + K_2 \cos(2x) + K_3 \cos(3x) + \ldots + K_n (\cos)(nx)] \quad \text{Equation 1}$$

The permeance for the poles A, $A_n$, B, and $B_n$ may be expressed by the following equations:

$$P(A) = P_o[1 + K_1 \cos(x) + K_2 \cos(2x) + K_3 \cos(3x) + \ldots + K_n \cos(nx)] \quad \text{Equation 2}$$

$$P(A_n) = P_o[1 + K_1 \cos(x + 180) + K_2 \cos\{2(x+180)\} + K_3 \cos\{3(x+180)\} + \cdots + K_n \cos\{n(x+180)\}] \quad \text{Equation 3}$$

$$P(B) = P_o[1 + K_1 \cos(x+a) + K_2 \cos\{2(x+a)\} + K_3 \cos\{3(x+a)\} + \cdots + K_n \cos\{n(x+a)\}] \quad \text{Equation 4}$$

$$P(B_n) = P_o[1 + K_1 \cos(x+a+180) + K_2 \cos\{2(x+a+180)\} + K_3 \cos\{3(x+a+180)\} + \cdots + K_n \cos\{n(x+a+180)\}] \quad \text{Equation 5}$$

In equations 2–5;
P(j) is equal to the permeance of the salients on the poles designated by the letter "j" (j representing the poles being considered);
$P_o$ is equal to the average permeance over an electrical cycle;
K is equal to the permeance harmonic modulation factor, and
x is equal to the shaft displacement from a reference position and is expressed as an electrical angle.

The reactance of any set of stator pole salients is related to the permeance of that set of stator pole salients by the equation:

$$X_j = WN^2 P_j \quad \text{Equation 6}$$

where W is equal to $2\pi F$ and N is equal to the number of turns of the winding about the pole.

The above equations 2–5 may be simplified by making the substitution:

$$U = WN^2 P_o \quad \text{Equation 7}$$

and applying the appropriate trignometric identities and wherein the resultant equations are expressed as a function of inductive reactance where A, $A_n$, B and $B_n$ are the inductive reactances of the respective stator windings. The respective inductive reactances are expressed as follows:

$$A = U[1 + K_1 \cos(x) + K_2 \cos(2x) + K_3 \cos(3x) + \cdots + K_n \cos(nx)] \quad \text{Equation 8}$$

$$A_n = U[1 - K_1 \cos(x) + K_2 \cos(2x) - K_3 \cos(3x) + \cdots + K_n \cos(nx + 180n)] \quad \text{Equation 9}$$

$$B = U[1 + K_1 \cos(x+a) + K_2 \cos(2x+2a) + K_3 \cos(3x+3a) + \cdots + K_n \cos(nx+na)] \quad \text{Equation 10}$$

$$B_n = U[1 - K_1 \cos(x+a) + K_2 \cos(2x+2a) - K_3 \cos(3x+3a) + \cdots + K_n \cos(nx+na+180n)] \quad \text{Equation 11.}$$

A traditional inductance bridge for a two phase system is illustrated in FIG. 1 wherein the voltage $V_x$ is measured across terminals 10,12 and is representative of one phase in the two phase system and voltage $V_y$ is measured across terminals 14,16 and is representative of the second phase in the two phase system. Under ideal theoretical conditions, $V_y$ is displaced 90° from the voltage signal represented by $V_x$. The voltages $V_x$ and $V_y$ are recognized as the carrier modulated voltage signals presented to the resolver to digital converter.

Referring to the above equations, it is clear that the subtraction of equation 9 from equation 8 and the subtraction of equation 11 from equation 10 eliminates the DC terms represented by the "1's" and eliminates all the even harmonic terms. Eliminating odd harmonic terms higher than 3rd order for the sake of simplicity, the expressions "$A - A_n$" and "$B - B_n$" are simplified to:

$$A - A_n = 2U[K_1 \cos(x) + K_3 \cos(3x)] \quad \text{Equation 12}$$

$$B - B_n = 2U[K_1 \cos(x+a) + K_3 \cos(3x+3a)] \quad \text{Equation 13}$$

The resolver to digital converter signal voltage $V_x$ can be expressed as:

$$V_x = e_c \frac{(A - A_n)}{(A + A_n)} \quad \text{Equation 14}$$

The resolver to digital converter signal voltage $V_y$ can be represented by the equation:

$$V_y = e_c \frac{(B - B_n)}{(B + B_n)} \quad \text{Equation 15}$$

The terms "$A + A_n$" and "$B + B_n$" in the above equations for the resolver-to-digital converter voltage signals are expressed below using the same considerations as was used in expressing the terms "$A - A_n$" and "$B - B_n$". Adding the expressions for A and $A_n$ and eliminating odd harmonic terms higher than the third order yields the following expression:

$$A + A_n = 2U[1 + K_2 \cos(2x)] \quad \text{Equation 16}$$

Likewise, adding the expressions for B and $B_n$ yields the expression:

$$B + B_n = 2U[1 + K_2 \cos(2x+2a)] \quad \text{Equation 17}$$

Now, making the appropriate substitutions for the RDC voltage signals $V_x$ and $V_y$ derived from the inductance bridge of FIG. 1 results in the following expressions for $V_x$ and $V_y$:

$$V_x = e_c \frac{[K_1 \cos(x) + K_3 \cos(3x)]}{[1 + K_2 \cos(2x)]} \quad \text{Equation 18}$$

$$V_y = e_c \frac{[K_1 \cos(x+a) + K_3 \cos(3x+3a)]}{[1 + K_2 \cos(2x+2a)]} \quad \text{Equation 19}$$

where in equations 18 and 19 $e_c$ is the carrier signal and is expressed as:

$$e_c = E_c \sin(wt)$$

The carrier signal voltage $e_c$ has no effect on the form of the two RDC voltage signals and both $V_x$ and $V_y$ can be divided by $e_c$ resulting in the following expressions where $X = V_x/e_c$ and $Y = V_y/e_c$:

$$x = \frac{[K_1\cos(x) + K_3\cos(3x + 3a)]}{[1 + K_2\cos(2x + 2a)]} \qquad \text{Equation 20}$$

$$y = \frac{[K_1\cos(x + a) + K_3\cos(3x + 3a)]}{[1 + K_2\cos(2x + 2a)]} \qquad \text{Equation 21}$$

From the above expressions of X and Y in equations 20 and 21, it can be seen that the RDC voltage signals exhibit the following characteristics:

1. The fundamental terms are equal in peak amplitude but are shifted in phase by the angle "a".
2. The third harmonic terms are equal in peak amplitude but one shifted in phase by the angle "3a".
3. The denominators in both expressions are equal in peak amplitude but differ in phase by the angle "2a". In each instance, the second harmonic content of the denominator results in a second harmonic modulation of the fundamental and the third harmonic terms. The result and effect of the modulation is that second harmonics are present in the voltage signals $V_x$ and $V_y$ and differ in phase by the angle "2a".
4. It is also clear that the phase angle between the fundamental components of the RDC voltage signals $V_x$ and $V_y$ is the angle "a" and that any error in the angle "a" from the desired phase difference of 90° results in the RDC voltage signals having an error in the quadrature relationship demanded between $V_x$ and $V_y$.
5. It is also clear from the above that both second and third order harmonics are present in both the RDC voltage signals $V_x$ and $V_y$.

The above sources of error in the RDC voltage signals $V_x$ and $V_y$ are substantially eliminated with the method and apparatus of the present invention which will now be described in detail.

Figure 2:
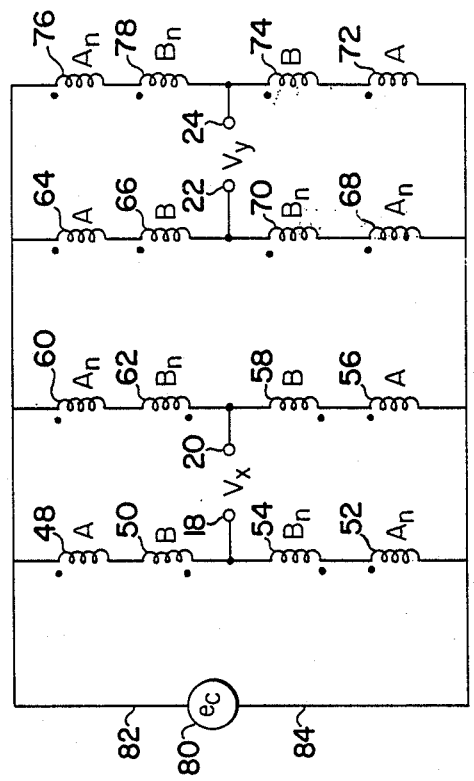
FIG. 2 is a schematic circuit diagram of an inductance bridge embodying the present invention for producing two-phase voltage signals.

Considering now the the inductance bridge illustrated in FIG. 2 for a two-phase system, the first phase is represented by the voltage $V_x$ as measured across terminals 18, 20. A second voltage $V_y$ having a phase relationship of 90° with respect to $V_x$ is measured across terminals 22, 24.

The voltage $V_x$ developed across terminals 18 and 20 of the inductance bridge of FIG. 2 may be expressed by the following:

$$V_x = e_c \frac{[A - A_n - B + B_n]}{[A + A_n + B + B_n]} \qquad \text{Equation 22}$$

The voltage $V_y$ developed across terminals 22 and 24 may be expressed by the following:

$$V_y = e_c \frac{[A - A_n + B + B_n]}{[A + A_n + B + B_n]} \qquad \text{Equation 23}$$

As explained above, A, $A_n$, B, and $B_n$ represent the inductive reactances of the respective stator windings and $e_c$ is equal to the carrier voltage signal and is expressed as stated above. Similarly, the nature of the expressions representative of $V_x$ and $V_y$ are expressed as X and Y respectively by dividing both by the term $e_c$ wherein $X = V_x/e_c$ and $Y = V_y/e_c$ resulting in the following expressions for X and Y:

$$X = \frac{[A - A_n - B + B_n]}{[A + A_n + B + B_n]} \qquad \text{Equation 24}$$

$$Y = \frac{[A - A_n + B - B_n]}{[A + A_n + B + B_n]} \qquad \text{Equation 25}$$

From the above expressions for X and Y it is apparent that the denominators are exactly equal in both phase and amplitude. Consequently, any effect of amplitude or phase on one of the RDC voltage signals has the same effect on the other of the RDC voltage signals and is of no consequence in the RDC decoding process.

The denominator, $[A+A_n+B+B_n]$ may be expressed by equation 26 where $A+A_n$ is expressed in equation 16 and $B+B_n$ is expressed in equation 17, respectively above:

$$A+A_n+B+B_n = 2U[2+K_2\{\cos(2x)+\cos(2x+2a)\}] \qquad \text{Equation 26}$$

Letting $A+A_n+B+B_n = D$ and reducing the expression using the appropriate trignometric identities, the denominator may be expressed as follows:

$$D = 2U[2+2K_2\cos(a)\cos(2x+a)] \qquad \text{Equation 27}$$

Examining the expression of the denominator in equation 27, it is seen for the special case where the angle "a" equals $+/-90°$, the cos (a) term becomes zero and accordingly, the denominator becomes a constant having a value equal to 4U. Therefore, for "a" equal to 90°, the second harmonic is completely eliminated. Although for the special case of "a" = $+/-90°$ the denominator becomes a constant, the effect of the second harmonic as explained above is inconsequential to the RDC decoding process. Accordingly, it is important to note that with the present invention the effect of second harmonics on the RDC voltage signals $V_x$ and $V_y$ are no consequence irrespective of the angle "a". The elimination of the effect of second harmonics on the RDC voltage signals $V_x$ and $V_y$ overcomes one of the problems associated with the prior art.

Turning next to an examination of the numerators of the expressions X and Y as defined in equations 24 and 25 respectively, the numerator $[A-A_n-B+B_n]$ may be expressed as follows:

$$A-A_n-B+B_n = 2U[K_1\{\cos(x)-\cos(x+a)\}+K_3\{\cos(x)-\cos(3x+3a)\}] \qquad \text{Equation 28}$$

and the numerator $A-A_n+B-B_n$ may be expressed by the following:

$$A-A_n+B-B_n = 2U[K_1\{\cos(x)+\cos(x+a)\}+K_3\{\cos(x)+\cos(3x+3a)\}] \qquad \text{Equation 29}$$

Again, odd harmonics higher than third order are eliminated for purposes of simplicity. Making the appropriate substitutions in the above expressions for X and Y, result in the following expressions:

$$X = \qquad \text{Equation 30}$$
$$\frac{2U[K_1\{\cos(x) - \cos(x + a)\} + K_3\{\cos(x) - \cos(3x + 3a)\}]}{D}$$

$$Y = \qquad \text{Equation 31}$$
$$\frac{2U[K_1\{\cos(x) + \cos(x + a)\} + K_3\{\cos(x) + \cos(3x + 3a)\}]}{D}$$

Applying the appropriate trignometric identities to the expressions for X and Y, X and Y may be expressed respectively as follows:

$$X = \frac{4U}{D}\left[K_1 \sin(a/2)\sin(x + a/2) + K_3 \sin\left(\frac{3a}{2}\right)\sin\left(3x + \frac{3a}{2}\right)\right]$$ Equation 32

$$Y = \frac{4U}{D}\left[K_1 \cos(a/2)\cos(x + a/2) + K_3 \cos\left(\frac{3a}{2}\right)\cos\left(3x + \frac{3a}{2}\right)\right]$$ Equation 33

An examination of the expressions for X and Y in equations 32 and 33 respectively, illustrate the advantages of the present invention over the prior art and are summarized as follows:

1. The peak amplitudes of the X and Y fundamental terms are exactly equal when the angle "a" equals $+/-90°$ since $K_1 \cos(90/2) = K_1 \sin(90/2)$.
2. The peak amplitudes of the X and Y third harmonic terms are exactly equal when the angle "a" = $+/-90°$ since $K_3 \cos(135) = K_3 \sin(135)$.
3. The phase angle relationship between the fundamental components of X and Y remain constant regardless of the value of the angle "a". The phase angle between the expressions represented by X and Y, and accordingly $V_x$ and $V_y$ is always 90° since cos (z) is equal to sin (z−90) where $Z = x + a/2$.
4. The denominator "D" is a constant with no harmonic content when the angle "a" equals 90°.
5. As the angle "a" deviates from 90°, the ratio of peak amplitudes of the fundamental terms will vary according to the following relationship:

$$\frac{X_1}{Y_1} = \frac{\sin(a/2)}{\cos(a/2)} = \tan(a/2)$$

and, the ratio of the third harmonic terms' peak amplitudes will vary according to the relationship:

$$\frac{X_3}{Y_3} = \frac{\sin(a/2)}{\cos(a/2)} = \tan(a/2)$$

6. Even harmonics are completely eliminated at the angle "a" = $+/-90°$.

Figure 3:
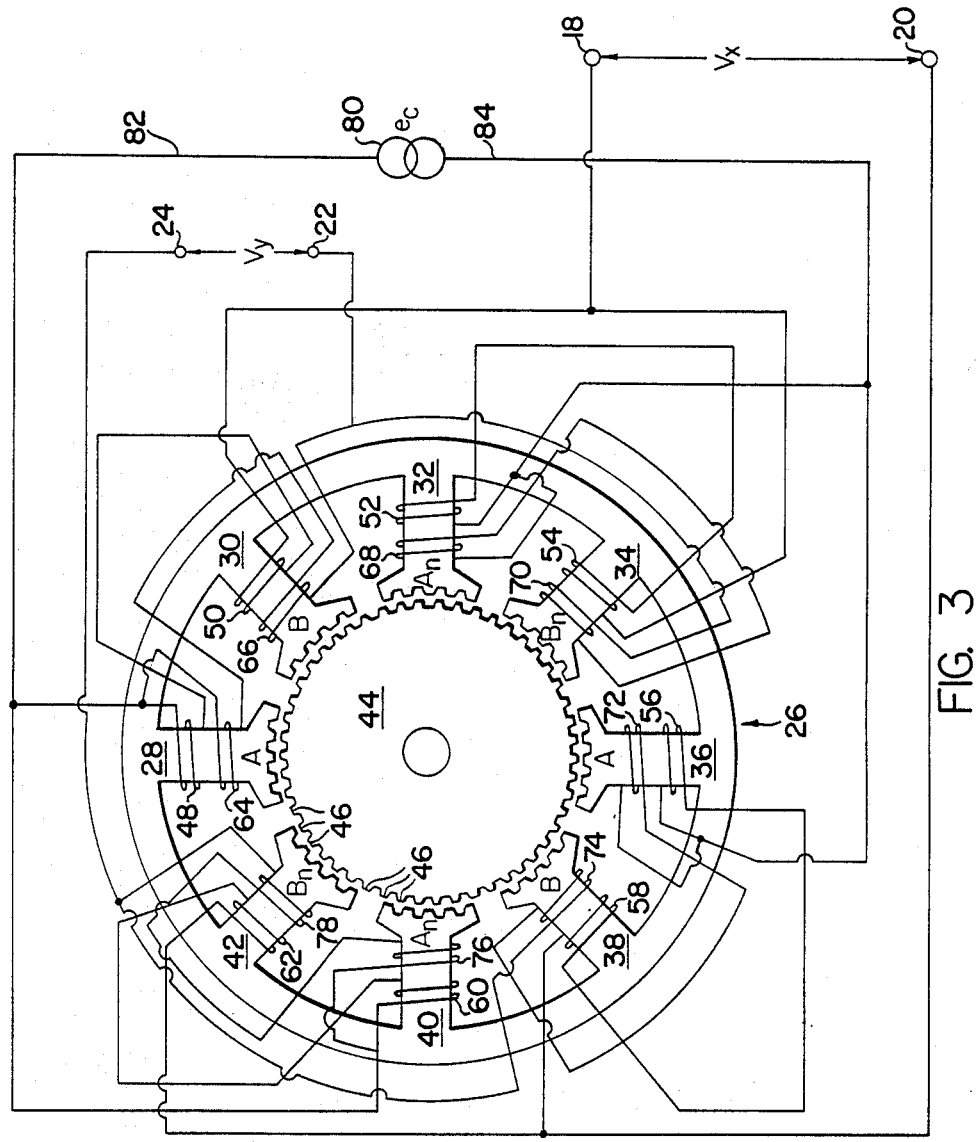
FIG. 3 is a somewhat schematic representation of a stator assembly and rotor having windings wound and interconnected in accordance with the present invention to produce two-phase voltage signals.

The inductance bridge illustrated in FIG. 2 and embodying the present invention may be implemented in a number of ways. Referring now to FIG. 3, the inductance bridge is shown implemented as illustrated and described by the following. A stator assembly 26 includes a number of toothed stator salients 28, 30, 32, 34, 36, 38, 40 and 42 extending radially inward and disposed equiangularly about the inner circumferential periphery of the stator assembly 24. A rotor 44 has a number of toothed salients 46, 46 located equidistant from one another along the outer circumferential periphery and arranged for coaction with the teeth of the toothed stator salients. Each of the sixteen (16) windings 48–72 are representative of the windings which have the respective inductive reactances A, $A_n$, B and $B_n$ in FIG. 2 and which are identified in FIG. 2. The windings are shown in FIG. 3 wound and interconnected in the appropriated series siding and opposing arrangement to produce the RDC voltage signals $V_x$ across terminals 18 and 20 and $V_y$ across terminals 22 and 24. A carrier signal voltage is produced by a carrier generator 80 and which generator is coupled across each leg of the inductance bridge as illustrated in FIG. 2. FIG. 3 illustrates the connection of one output lead 82 of the carrier generator 80 to one end of each of windings 48, 60, 64 and 76 and the output lead 84 to one end of each of the windings 52, 56, 68 and 72.

It is seen that the embodiment of the invention shown in FIG. 3 produces the RDC voltage signals:

$$V_x = e_c \frac{[A - A_n - B + B_n]}{[A + A_n + B + B_n]}, \text{ and}$$

$$V_y = e_c \frac{[A - A_n + B - B_n]}{[A + A_n + B + B_n]}$$

In reality, manufacturing tolerances do not permit perfect alignment and positioning of stator salients and the teeth of the stator salients and the rotor. Accordingly, the inductive reactances produced by each of the windings may not be exactly equal and may require adjustment. Recalling from above that the magnitude of inductive reactance is proportional to the number of turns N of a winding, turns may be added or subtracted from each winding as appropriate to achieve the desired equality of inductive reactances.

Figure 4:
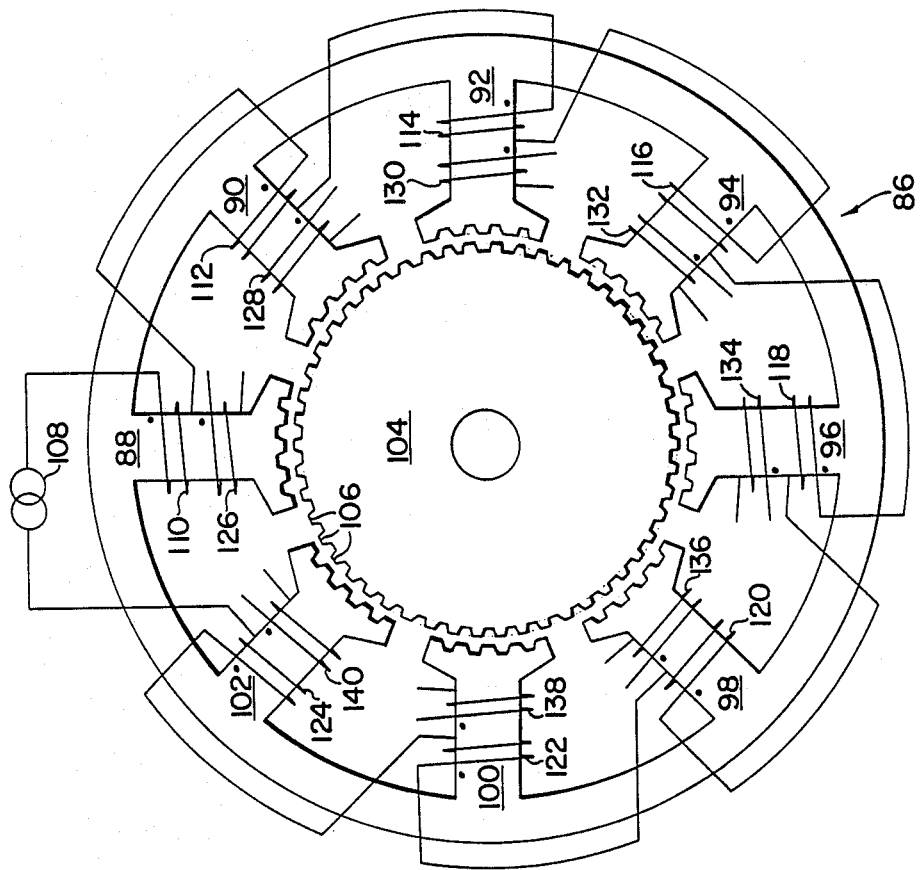
FIG. 4 is a somewhat schematic representation of a stator assembly and rotor having windings wound and interconnected in accordance with another odiment of the present invention which implements the production of two-phase signals electronically.
Figure 5:
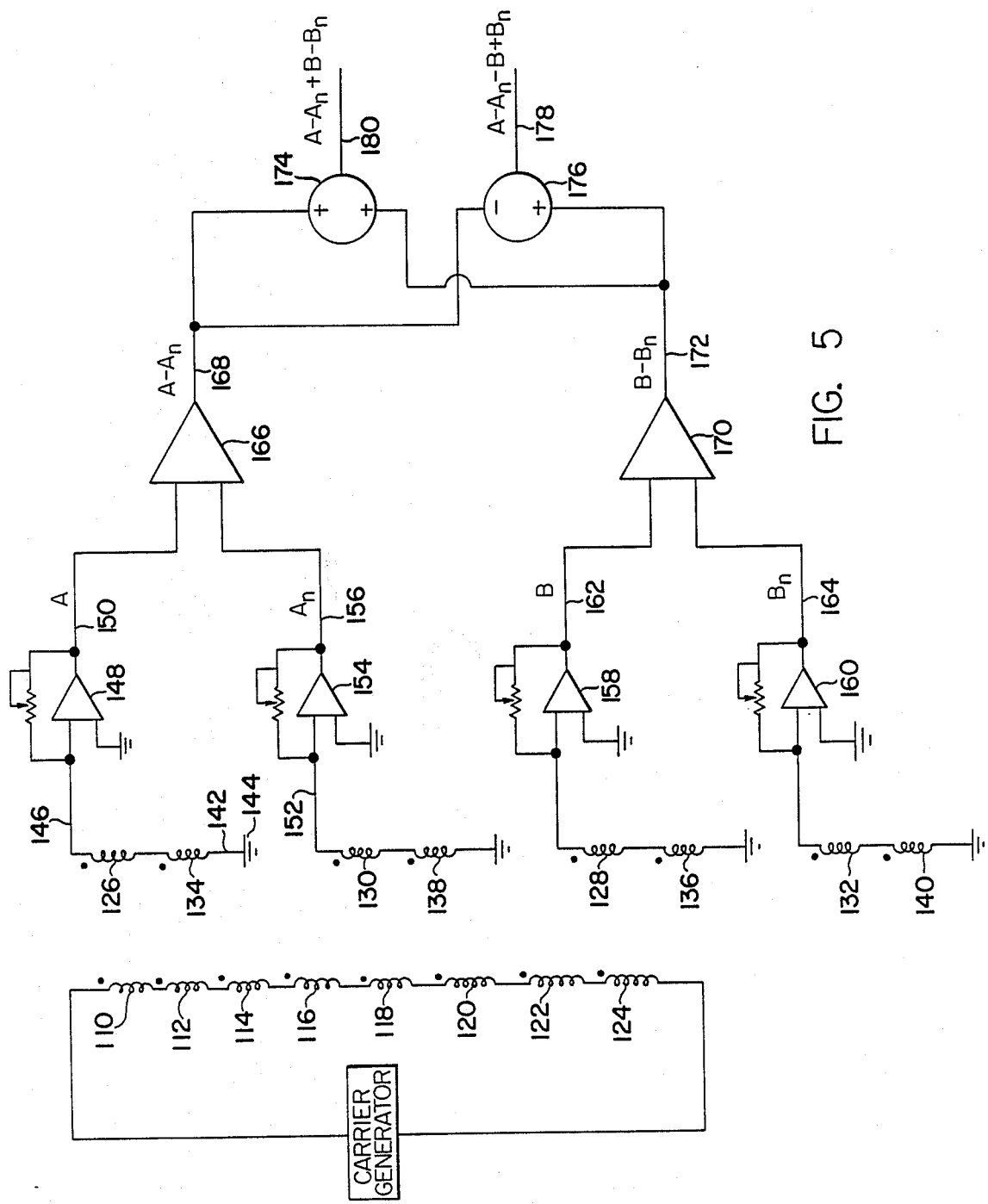
FIG. 5 is a schematic circuit representation showing the implementation of the present invention using electronic circuit devices.

Turning now to FIGS. 4 and 5, the present invention is shown embodied using operational amplifiers and well known electronic devices to perform the appropriate addition and subtraction of the "A", "$A_n$", "b" and "$B_n$" signals to produce the RDC signals $V_x$ and $V_y$. The required signals for the electronic implementation are generated by the stator assembly 86 which includes a number of toothed stator salients 88, 90, 92, 94, 96, 98, 100 and 102 and a rotor 104 which also has a number of toothed salients 106, 106 for coaction with the teeth of the stator salients. The stator assembly 86 is similar to the stator assembly 26 of FIG. 3. Each of the stator salients is wound with an associated winding which is excited by a carrier voltage signal produced by a carrier generator 108. The carrier generator 108 is connected in series with the windings 110, 112, 114, 116, 118, 120, 122 and 124 which are connected in a series aiding connection.

Each of the stator salients also include an additional winding which are interconnected as illustrated in FIG. 5 to provide input signals from which the RDC signals $V_x$ and $V_y$ are produced. For purposes of clarity, the input signal windings 126, 128, 130, 132, 134, 136, 138 and 140 are not shown interconnected in FIG. 4. It is understood and readily apparent to those skilled in the art that the windings are connected as illustrated in the electrical schematic diagram of FIG. 5.

Referring to FIG. 5, the stator windings 110 to 124 are schematically shown connected in a series aiding configuration. Windings 126 and 134 are connected in a series aiding fashion with one end 142 of winding 134 connected to a reference potential, in this case a ground reference potential 144. One end 146 of winding 126 is connected to one input of an operational amplifier 148 and provides an input voltage signal representative of the inductive reactance "A". The output 150 of the amplifier 148 provides a voltage signal proportional to the inductive reactance "A". Similarly, windings 130 and 138 provide an input signal on lead 152 to operational amplifier 154. The output 156 of amplifier 154 provides a voltage signal proportional to the inductive reactance "$A_n$". In a similar manner as above, windings 128 and 136 provide an input signal to operational amplifier 158 and windings 132 and 140 provide an input signal to operational amplifier 160. The output 162 of amplifier 158 is a voltage signal proportional to the inductive reactance "B" and the output 164 of amplifier 160 is proportional to the inductive reactance "$B_n$". The amplitudes of the respective voltage signals representative of A, $A_n$, B and $B_n$ are easily trimmed or adjusted in a well known manner through adjustment of a feedback resistance network associated with each of the operational amplifiers.

The voltage signals on leads 150 and 156 are supplied to a differential amplifier 166 which performs the subtraction function to provide a voltage signal at its output 168 equal to the term "$A-A_n$". In a similar manner, the voltage signals on leads 162 and 164 are supplied to a differential amplifier 170 which performs the subtraction function to provide a voltage signal at its output 172 equal to the term "$B-B_n$".

The voltage signals on leads 168 and 172 are supplied to summing devices 174 and 176, respectively. The output 178 of device 176 is a voltage signal representative of the term "$A-A_n-B+B_n$". It will be recognized from above that this term is of the form for the RDC voltage signal $V_x$. The output 180 of device 174 is a voltage signal representative of the term "$A-A_n+B-B_n$" which is of the form for the RDC voltage signal $V_y$.

A method and apparatus for producing two-phase RDC voltage signals has been described above in several preferred embodiments. It will be understood that numerous substitutions and changes may be made by those skilled in the art without departing from the spirit and scope of the invention and therefore the invention is presented by way of illustration rather than limitation.

I claim:

1. Apparatus for producing two-phase voltage signals for use with a resolver-to-digital converter, said apparatus comprising:

first means for producing first inductive reactance means;

second means for producing second inductive reactance means phase shifted 180 electrical degrees from said first inductive reactance means;

third means for producing third inductive reactance means, said third inductive reactance being phase shifted 90 electrical degrees from said first inductive reactance means;

fourth means for producing fourth inductive reactance means phase shifted 180 electrical degrees from said third inductive reactance means;

means for impressing a carrier voltage across said first, second, third and fourth inductive reactance means;

said first, second, third and fourth inductive reactance means, respectively being connected in series aiding and opposing arrangements so that one voltage signal of the two-phase voltage signals is produced by the quotient of the algebraic sum of said first and fourth minus said second and third inductive reactances divided by the algebraic sum of said first, second, third and fourth inductive reactances multiplied by said carrier voltage, and the second of the two-phase voltage signals is produced by the quotient of the algebriac sum of said first and second minus said third and fourth inductive reactances divided by the algebraic sum of said first, second, third and fourth inductive reactances multiplied by said carrier voltage, whereby said first and second voltage signals of said two-phase voltage signals are equal in amplitude and phase shifted from one another by 90 electrical degrees.

2. Method for producing two-phase voltage signals for use with a resolver-to-digital converter (RDC), said method comprising the steps of:

producing a first inductive reactance;

producing a second inductive reactance phase shifted 180 electrical degrees from said first inductive reactance;

producing a third inductive reactance phase shifted 90 electrical degrees from said first inductive reactance;

producing a fourth inductive reactance phase shifted 180 electrical degrees from said third inductive reactance;

connecting said first, second, third and fourth inductive reactances to provide a first algebriac sum of said first and fourth minus said second and third inductive reactances and a second algebraic sum of said first, second, third and fourth inductive reactances and a third algebraic sum of said first and second minus said third and fourth inductive reactances;

impressing a carrier voltage across said first, second, third and fourth inductive reactances;

generating a first quotient of said first algebraic sum divided by said second algebraic sum and multiplying said first quotient by said carrier voltage to produce the first voltage signal of said two-phase voltage signals, and generating a second quotient of said third algebraic sum divided by said second algebraic sum and multiplying said second quotient by said carrier voltage to produce the second voltage signal of said two-phase voltage signals.

* * * * *